UNITED STATES PATENT OFFICE.

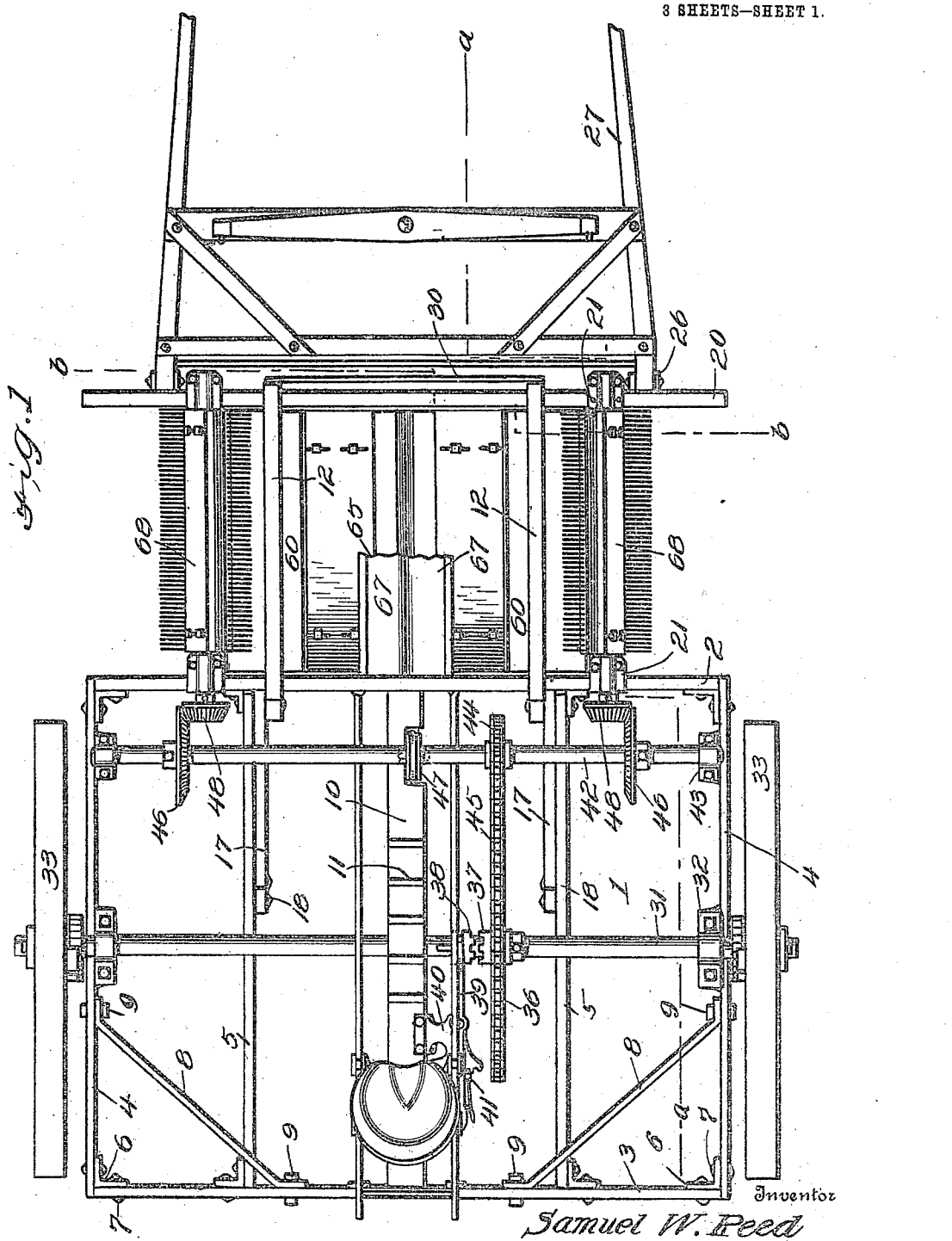

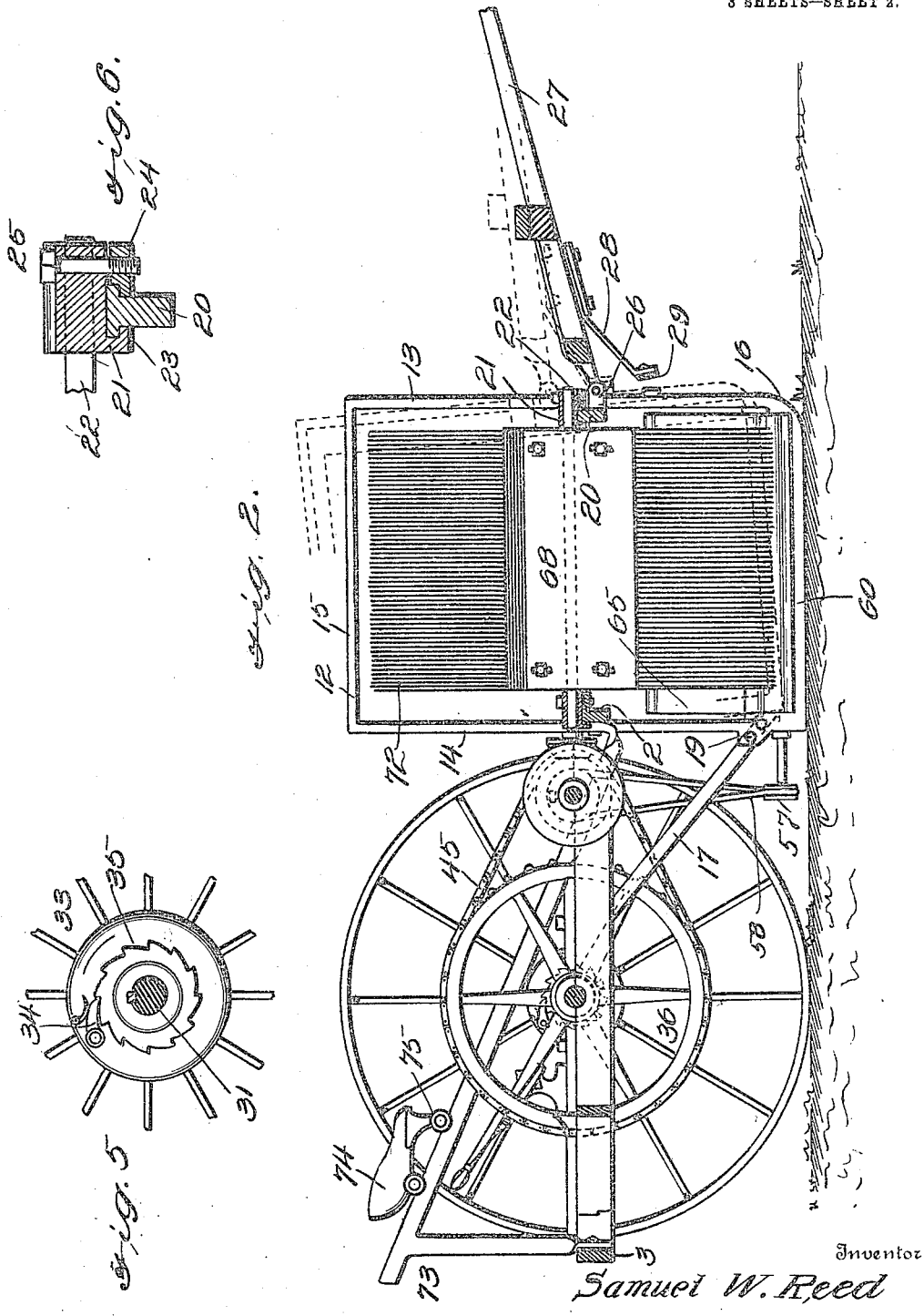

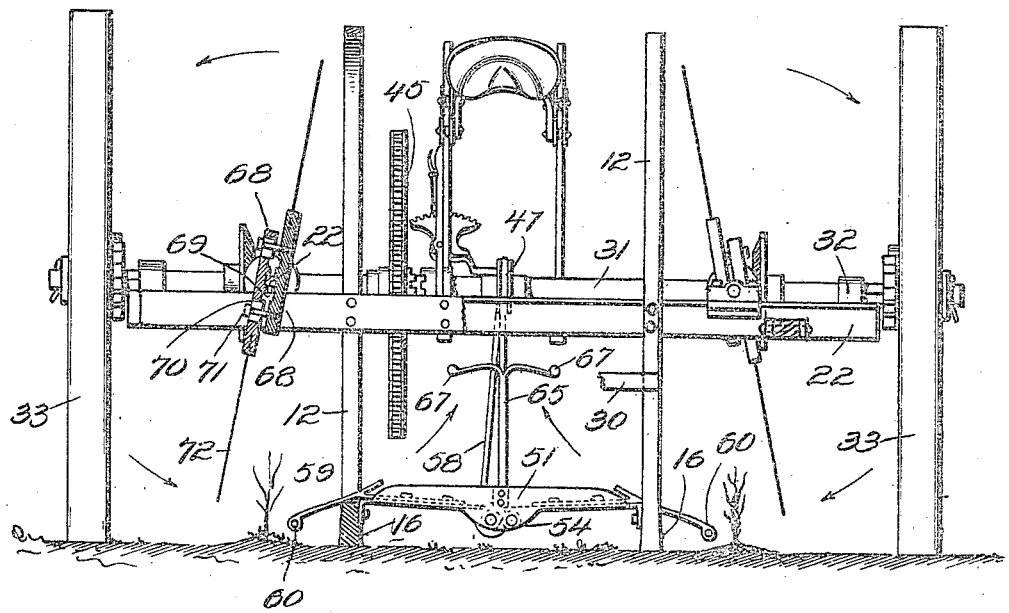
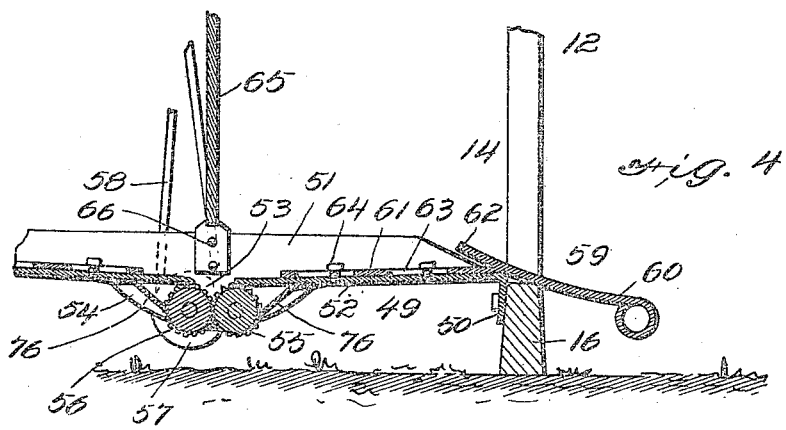

SAMUEL W. REED, OF GRAND RAPIDS, MICHIGAN.

POTATO-BUG EXTERMINATOR.

963,011.  Specification of Letters Patent.  Patented June 28, 1910.

Application filed May 21, 1909. Serial No. 497,491.

*To all whom it may concern:*

Be it known that I, SAMUEL W. REED, a citizen of the United States, residing at Grand Rapids, in the county of Kent and State of Michigan, have invented new and useful Improvements in Potato-Bug Exterminators, of which the following is a specification.

This invention is an improved machine for brushing potato bugs from the plants and destroying such bugs and the said invention consists in the construction, combination and arrangement of devices hereinafter described and claimed.

One object of my invention is to effect improvements in the construction of the pan whereby the same may be adjusted as may be required to enable it to operate between rows of plants at any distance apart.

A further object is to effect means in the construction of the brushes whereby they may be adjusted and caused to strike the plants at any desired height above the ground for the purpose of dislodging the bugs from the plants.

A further object is to provide improved means whereby the machine may be balanced on its supporting axle to raise the runners from the ground and enable the machine to be readily turned at the end of a row or driven across the field or along a road.

A further object is to effect improvements in the construction of the frame of the machine.

In the accompanying drawings:—Figure 1 is a plan of a potato bug destroying machine constructed in accordance with this invention. Fig. 2 is a vertical longitudinal sectional view of the same on the plane indicated by the line *a—a* of Fig. 1. Fig. 3 is a vertical transverse sectional view of the same on the plane indicated by the line *b—b* of Fig. 1. Fig. 4 is a detail vertical transverse sectional view showing a portion of the receiving pan, the crushing rollers, the fender over the crushing rollers and one of the supporting runners. Fig. 5 is a detail elevation partly in section of one of the supporting wheels and the pawl and ratchet mechanism which connects the same to the driven and supporting axle. Fig. 6 is a detail sectional view showing one side bar of the frame and also showing one of the bearings for the counter-shaft.

The main frame 1 is rectangular in form and comprises front and rear cross bars 2, 3, side bars 4 and intermediate bars 5 longitudinally disposed. In the angles between the said bars of the frame are angle pieces 6 which are secured by rivets or other suitable fastening devices indicated at 7 whereby the parts of the said frame are securely fastened together. Said frame is also provided in its rear corners with brace bars 8, the ends of which are respectively secured to the side bars 4 and rear cross bar 3 by means of bolts 9. A longitudinally disposed stretcher or foot board 10 is at the center of the main frame and extends from the front bar 2 to the cross bar 3. The said foot board or stretcher board is provided on its upper side at suitable distances apart with cleats 11. A pair of forwardly extending vertical frames 12 are at the front end of the main frame 1 at suitable distances from the sides thereof and appropriately spaced apart. Each of the said vertical frames is rectangular in form comprising vertical front and rear bars 13, 14, a top bar 15 and the bottom bar 16, the said bottom bars having their front ends rounded on their under sides and forming runners. The bars 14 of the said vertical frames bear against the rear side of the front cross bar 2 of the main frame. Inclined braces 17 have their rear upper ends secured to the intermediate bars 5 as at 18 and their lower ends secured to the rear sides of the runner frames 12, near the lower corners of said runner frames as at 19. A cross bar 20 which is disposed in line with the bars 2, 3, of the main frame is secured to the rear sides of the front vertical bars 13 of the runner frames 12 and on the said cross bars 2, 20, are bearings 21 for a pair of longitudinally disposed brush shafts 22. The said cross bars are T-shaped and the said bearings are each provided on the under side with a guide way 23 to receive the head and one flange of one of said bars and a flange clamping jaw or plate 24 to engage the other flange of one of said bars, the said clamping jaws being adjustably secured to the said bearings by means of screws 25 whereby the said bearings may be adjusted as may be required on said cross bars and may be set at any desired adjustment. The front cross bar 20 of the runner frames is provided with couplings 26 which connect a pair of shafts or thills 27 to the machine for vertical angular movement, said shafts or thills being provided on their under sides at their rear ends with downwardly and rearwardly inclined arms 28 which carry a cross bar 29 which when said shaft or thills are lowered with respect to the frame of the machine, engages a corresponding bar 30 which is secured on the front sides of the runner frames.

The axle shaft 31 is mounted in bearings 32 which are secured on the side bars 4 of the main frame. Driving and supporting wheels 33 are loosely mounted on the axle shaft and are connected thereto by pawls 34 carried by the hubs of said wheels and ratchet wheels 35 which are secured by keys or other suitable means on the axle shaft for rotation therewith. Hence the driving and supporting wheels cause the axle shaft to rotate when the machine is being driven and enable the machine to be readily turned. On the axle shaft is a sprocket wheel 36 which is loose thereon and is provided on one side with a clutch element 37. A clutch element 38 is splined on the axle shaft and may be moved into and out of engagement with the clutch arm 37 in order to hook the sprocket wheel 36 to said axle shaft or release the same therefrom. A shipping lever 39 is provided to operate the said movable clutch element and is fulcrumed to a segment 40 and provided with a dog 41 for engagement with the teeth of said segment to lock said shipping lever when fixed either in position to engage the clutch 38 with the sprocket wheel or release the clutch therefrom.

A counter-shaft 42 which is parallel with the axle shaft is mounted in bearings 43 on the sides of the main frame near the front end thereof. Said counter shaft has a sprocket wheel 44 which is connected by an endless sprocket chain 45 with the sprocket wheel 36. The counter-shaft is further provided with a pair of beveled gears 46 near its ends and at or near its center with a pulley 47. The gears 46 engage beveled pinions 48 which are on the rear ends of the brush shafts 22 and hence said brush shafts are driven from the counter shaft, the latter being driven from the axle shaft as will be understood.

A pan 49 is provided with depending side flanges 50 bolted to the inner sides of the runners 16 and has front and rear upstanding end walls 51. The bottom of the pan is formed by a pair of downwardly and inwardly inclined sections 52 which are spaced apart so that an opening 53 is formed longitudinally in the center of the bottom of the pan and between the inclined sections thereof. The front and end walls 51 are provided with downwardly extending central portions 54 in which are bearings for the reception of the ends of journals of a pair of crushing rollers 55, the opposing sides of which are below the opening 53 in the bottom of the pan so that bugs which drop through said opening fall between said crushing rollers. The said crushing rollers are provided at one end with inter-engaging gears 56 and the journal or shaft of one of said rollers has at its rear end a pulley 57 which is connected by an endless belt 58 with the pulley 47 on the counter-shaft 42. Hence the said crushing rollers are revolved and caused to crush and destroy the bugs which drop between their opposing surfaces. The pan is provided on opposite sides with laterally adjustable aprons 59 each of which comprises an inwardly upwardly inclined wing 60 and a bottom portion 61 which bears on one of the bottom sections of the pan, the said wings 60 presenting overhangs 62 at their inner portions and which are located above the outer portions of the bottoms 61 so that the said overhangs converge downwardly and outwardly to the outer edges of the bottom portions 61 of said wings as shown in Fig. 4. This construction makes it impossible for the bugs to pass from the bottom of the pan onto the wings 60. The bottom portions 61 of the aprons are provided with lateral slots 63. Adjusting screws 64 extend through the said slots and engage the bottom sections of the pan and in connection with the said slots serve to connect the aprons of the pan so that the aprons may be adjusted laterally toward and from the pan to vary the width of the spaces between the outer sides of the wings of the aprons as may be required by the width of the spaces between the rows of plants. A fender 65 is disposed vertically and longitudinally of the pan above the opening 53 in the bottom thereof and has its lower corners secured to the end walls 51 of the pan as at 66. The said apron is provided at its upper portion with oppositely disposed laterally extending wings 67.

The major portions of the brush shafts 22 between the bearings thereof are rectangular or of other than cylindrical form. A pair of brush heads or plates 68 are employed in connection with each of the said brush shafts. The said heads or plates are provided on their inner sides with adjusting notches 69 for the reception of the brush shafts so that the said brush heads or plates may be adjusted with reference to the said shafts and one of each pair of said heads or plates is provided with adjusting openings 70 for the reception of clamping and adjusting screws 71 with which the other plate is provided and hence the said brush heads or plates may be clamped on opposite sides of the brush shafts and may be adjusted radially with respect thereto. Each of the brush heads or plates is provided with brush elements, wires or the like 72 which extend downwardly therefrom and the radius of the brushes may be increased or diminished by adjusting their plates or heads as will be understood, and hence the brushes may be caused to operate at any desired distance above the ground.

When the machine is in operation, the brushes revolve in opposite directions as shown by the arrows in Fig. 3; so that their lower sides move toward each other and over and through the plants in the rows and dislodge the bugs from the plants and dash the bugs against the fender 65 from which they drop to the bottom of the pan and through the opening 53 to the crushing rollers. The outer edges of the wings of the fender extend slightly within the paths of the brushes so that the brushes strike said wings as they revolve and said wings serve to effectually dislodge such bugs as may be caught by the brushes.

The main frame 1 of the machine is provided at suitable distances from the opposite sides of the foot or stretcher board 10 with inclined supporting ways 73 which are secured to the front and rear cross bars 2, 3 of said main frame and inclined downwardly and forwardly. The seat 74 for the driver is provided with grooved supporting rollers 75 which engage the upper edges of the said inclined supporting ways 73 and hence the driver by placing his heels against any of the cleats on the front or stretcher board may adjust the seat longitudinally of the main frame so as to apply his weight to said frame at any desired point and hence by moving the seat rearwardly the driver can cause the front end of the machine to rise from the ground to enable it to be readily turned or to be driven from one point to another.

What is claimed is:—

1. A machine of the class described having a main frame, supporting elements therefor, vertically disposed runner frames connected to the main frame and spaced apart, revoluble brushes disposed at the outer sides of said runner frames and adjustable toward and from each other, and a pan between said brushes mounted on said runner frames, said pan having an upwardly extending fender provided with overhanging wings extending toward the brushes and into the paths thereof.

2. A machine of the class described having a pair of revolving brushes spaced apart to operate on contiguous rows of plants, a pan disposed between said brushes to receive the bugs thrown by the brushes from the plants, said pan having aprons at its sides adjustable laterally to vary the width of the pan as may be required by the width of the space between the rolls, each of said aprons presenting an inwardly upwardly inclined surface and an overhang at the inner edge of said inwardly upwardly inclined surface and above the bottom of the pan.

3. A machine of the class described having a fan for dislodging bugs from the plants and throwing the bugs in one direction, a pan to receive the bugs and provided at the side next the fan with an apron presenting an inwardly upwardly inclined surface and an overhang at the inner edge of said inwardly upwardly inclined surface and above the bottom of the pan.

4. In a machine of the class described having a flexible revolving brush for the purpose set forth, a pan having an opening in the bottom thereof, bug destroying means in said opening and a fender extending upwardly above said opening, said fender having an overhanging wing extending toward the brush and into the path thereof.

5. A machine of the class described having a main frame, runners connected thereto, a pan having depending side flanges secured to the runners and provided at its center with a longitudinal opening, bug-destroying means below said opening, a fender carried by the pan and disposed above such opening, and aprons on the pan at the sides thereof each comprising a bottom portion bearing on the pan, and an inwardly upwardly inclined wing presenting an overhang at its inner edge said wing extending outwardly over one of the runners.

In testimony whereof I affix my signature in presence of two witnesses.

SAMUEL W. REED.

Witnesses:
BLANCHE S. MARTIN,
GEORGE C. BROWN.